United States Patent
Motoki et al.

(10) Patent No.: US 9,176,710 B2
(45) Date of Patent: Nov. 3, 2015

(54) DYNAMICALLY SELECTING SERVICE PROVIDER, COMPUTING SYSTEM, COMPUTER, AND PROGRAM

(71) Applicant: INTERNATIONAL BUSINESS MACHINES CORPORATION, Armonk, NY (US)

(72) Inventors: Toshiyasu Motoki, Zama (JP); Dan Tateno, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/649,516

(22) Filed: Oct. 11, 2012

(65) Prior Publication Data
US 2013/0097578 A1    Apr. 18, 2013

(30) Foreign Application Priority Data
Oct. 18, 2011    (JP) .................................. 2011-229031

(51) Int. Cl.
G06F 9/44    (2006.01)
G06F 9/50    (2006.01)
G06F 9/445    (2006.01)

(52) U.S. Cl.
CPC .............. *G06F 8/00* (2013.01); *G06F 9/44521* (2013.01); *G06F 9/5072* (2013.01); *G06F 2209/549* (2013.01)

(58) Field of Classification Search
None
See application file for complete search history.

(56) References Cited

U.S. PATENT DOCUMENTS

| 7,921,195 B2* | 4/2011 | Jaiswal et al. ................ 709/223 |
| 8,949,390 B2  | 2/2015 | Sano |
| 2002/0087674 A1* | 7/2002 | Guilford et al. ............. 709/223 |
| 2004/0098606 A1* | 5/2004 | Tan et al. ..................... 713/200 |
| 2004/0128186 A1* | 7/2004 | Breslin et al. ................. 705/10 |

(Continued)

FOREIGN PATENT DOCUMENTS

| JP | 2006072785 A | 3/2006 |
| JP | 2011048548 A | 3/2011 |

OTHER PUBLICATIONS

Berl, Andreas, et al. "Energy-efficient cloud computing." The computer journal 53.7 (2010): 1045-1051. Retrieved on [Jun. 12, 2015] Retrieved from the Internet: URL<http://comjnl.oxfordjournals.org/content/53/7/1045.short>.*

(Continued)

*Primary Examiner* — Tuan Q. Dam
*Assistant Examiner* — Cheneca Smith
(74) *Attorney, Agent, or Firm* — Edward J. Lenart; James R. Nock; Kennedy Lenart Spraggins LLP

(57) ABSTRACT

To enable a service consumer that can use multiple service providers to dynamically select a service provider that satisfies a service level requested for each processing method to be called at the time of execution of an application. A cloud service directory (CSD) provides an evaluation table indicative of the evaluation of resource information on each cloud service provider (CSP), and each cloud service consumer (CSC) defines service levels requested by itself and items of resource information associated with each processing method as a request table and an association table, respectively. Then, the formats of these tables and the definitions of the service levels are standardized throughout the entire computing system. This enables each CSC to use a distribution table in order to select and use an appropriate CSP for each processing method.

13 Claims, 8 Drawing Sheets

(56) References Cited

U.S. PATENT DOCUMENTS

| | | | |
|---|---|---|---|
| 2004/0194085 A1* | 9/2004 | Beaubien et al. | 718/100 |
| 2006/0190605 A1* | 8/2006 | Franz et al. | 709/226 |
| 2006/0212359 A1* | 9/2006 | Hudgeon | 705/26 |
| 2007/0168874 A1* | 7/2007 | Kloeffer et al. | 715/764 |
| 2007/0226228 A1* | 9/2007 | Her et al. | 707/10 |
| 2007/0234272 A1* | 10/2007 | Hegyi | 717/101 |
| 2008/0195410 A1* | 8/2008 | Stolz | 705/1 |
| 2011/0131309 A1 | 6/2011 | Akiyama et al. | |
| 2011/0153727 A1 | 6/2011 | Li | |
| 2012/0030356 A1* | 2/2012 | Fletcher | 709/226 |
| 2012/0060165 A1* | 3/2012 | Clarke | 718/104 |
| 2013/0019013 A1* | 1/2013 | Rice et al. | 709/225 |

OTHER PUBLICATIONS

Di Nitto, Elisabetta, et al. "A journey to highly dynamic, self-adaptive service-based applications." Automated Software Engineering 15.3-4 (2008): 313-341. Retrieved on [Jun. 12, 2015] Retrieved from the Internet: URL<http://link.springer.com/article/10.1007/s10515-008-0032-x>.*

* cited by examiner

[REQUEST TABLE]

| ITEM OF RESOURCE INFORMATION | REQUESTED SERVICE LEVEL |
|---|---|
| NETWORK PERFORMANCE | 1 |
| VIRTUAL SYSTEM PERFORMANCE | 3 |
| UTILIZATION RATE | 2 |
| SECURITY | 3 |
| CSP'S FINANCIAL HEALTH | 5 |

FIG. 4A

[ASSOCIATION TABLE]

| METHOD | ASSOCIATED ITEM |
|---|---|
| METHOD1 | NETWORK PERFORMANCE |
|  | CSP'S FINANCIAL HEALTH |
| METHOD2 | SECURITY |
|  | CSP'S FINANCIAL HEALTH |
| METHOD3 | VIRTUAL SYSTEM PERFORMANCE |
|  | UTILIZATION RATE |
|  | CSP'S FINANCIAL HEALTH |
| : | : |

FIG. 4B

[EVALUATION TABLE]

| ITEM OF RESOURCE INFORMATION | SERVICE LEVEL EVALUATION | | | |
|---|---|---|---|---|
|  | CSP1 | CSP2 | CSP3 | CSP4 |
| NETWORK PERFORMANCE | 2 | 1 | 3 | 1 |
| VIRTUAL SYSTEM PERFORMANCE | 3 | 6 | 1 | 1 |
| UTILIZATION RATE | 2 | 5 | 6 | 2 |
| SECURITY | 3 | 7 | 2 | 1 |
| CSP'S FINANCIAL HEALTH | 2 | 4 | 5 | 6 |
| : | : | : | : | : |

FIG. 4C

[DISTRIBUTION TABLE]

| METHOD | CSP USED |
|---|---|
| METHOD1 | CSP2 |
| METHOD2 | CSP3 |
| METHOD3 | CSP1 |
| : | : |

FIG. 5A

[DISTRIBUTION TABLE]

| METHOD | CSP USED |
|---|---|
| METHOD1 | CSP2 |
| METHOD2 | CSP1 |
| METHOD3 | CSP1 |
| : | : |

FIG. 5B

DYNAMICALLY SELECTING SERVICE PROVIDER, COMPUTING SYSTEM, COMPUTER, AND PROGRAM

CLAIM OF PRIORITY

This application claims priority under 35 U.S.C §119 to Japanese Patent Application No. 2011-229031, filed Oct. 18, 2011, the entire text of which is specifically incorporated by reference herein.

BACKGROUND OF THE INVENTION

1. Field of the Invention

The field of the invention is data processing, or more specifically, methods and systems for dynamically selecting a service provider, a computing system, a computer, and a program.

2. Description of Related Art

There has been known a federated cloud service environment for transparently providing interoperable multiple incompatible cloud services (for example, Japanese Patent Application Publication 2011-129117). There have also been known a primary cloud server, a method of providing a service, and a computer program (for example, see Japanese Patent Application Publication 2011-118451), where a service level agreement is dynamically determined based on the actual level of a service provided by a primary cloud or updated preference information to select and provide the service including a secondary cloud.

SUMMARY OF THE INVENTION

Problem to be Solved by the Invention

Various service providers provide software and data through networks such as the Internet in the form of services. Service consumers use infrastructures provided by the service providers to build applications for services provided by themselves.

Since building an application depending only on one service provider is risky for the service consumer, a configuration for using multiple service providers to disperse risk has been closely watched. In such a configuration, it is desired that the service consumer should select the optimum service provider as needed even after building and running an application.

It is an object of the present invention to enable a service consumer that can use multiple service providers to dynamically select a service provider that satisfies a service level requested for each method to be called at the time of execution of an application.

Means for Solving the Problems

In view of such an object, a first aspect of the present invention provides a method of sending methods to a service provider from a service consumer using the service provider to provide a service to end users, the method including: a step of acquiring an evaluation table representing, in a common format, resource information on multiple service providers as information indicative of each service provided by each service provider and/or the quality or state of the service provider, which is the basis of selection of a service provider made by the service consumer; a step of referring to the acquired evaluation table to extract, for each method to be called by the service consumer, a service provider that satisfies a service level requested by the service consumer for the method from multiple service providers; and a step of converting the method into an instruction to the service provider extracted for the method when the service consumer calls the method, and sending the instruction to the service provider.

A second aspect of the present invention is based on the method of the first aspect, further including a step of updating the evaluation table each time the resource information on any of multiple service providers is changed, wherein in the acquiring step, the updated evaluation table is acquired.

A third aspect of the present invention is based on the method of the second aspect, wherein in the extracting step, when a failure occurs in one of multiple service providers, the evaluation table in which resource information indicating that the one service provider is unavailable is reflected is referred to extract, for each method to be called by the service consumer, a service provider that satisfies the service level from the multiple service providers except the one service provider.

A fourth aspect of the present invention is based on the method of any one of the first to third aspects, wherein in the extracting step, the acquired evaluation table is referred to extract, for each method to be called by the service consumer, a service provider that satisfies a service level from multiple service provider, where the service level is requested by the service consumer for an associated item as an item of the resource information predefined to be associated with the method.

A fifth aspect of the present invention is based on the method of the fourth aspect, wherein in the extracting step, the acquired evaluation table is referred to extract, for each method to be called by the service consumer, a service provider that satisfies a service level from multiple service provider, where the service level is requested by the service consumer for the associated item of the method including an item of information indicative of a state of the service provider in which the quality of a service provided by the service provider could be affected.

A sixth aspect of the present invention provides a method of sending methods to a service provider from a service consumer using the service provider to provide a service to end users, the method including: a step of acquiring resource information respectively from multiple service providers at predetermined intervals, where the resource information is information indicative of each service provided by each service provider and/or the quality or state of the service provider, which is the basis of selection of a service provider made by the service consumer; a step of creating or updating an evaluation table representing, in a common format, the resource information on the multiple service providers based on the acquired latest resource information; a step of acquiring the updated evaluation table each time the evaluation table is updated; a step of referring to the evaluation table in response to acquiring the updated evaluation table to extract, for each method to be called by the service consumer, a service provider that satisfies a service level from multiple service providers, where the service level is requested by the service consumer for an associated item of the method as an item of the resource information predefined to be associated with the method and including an item of information indicative of a state of the service provider in which the quality of a service provided by the service provider could be affected; and a step of converting the method into an instruction to the service provider extracted for the method when the service consumer calls the method, and sending the instruction to the service provider, wherein in the extracting step, when a failure occurs in one of the multiple service providers, the evaluation table in which resource information indicating that the one service provider is unavailable is reflected is referred to extract, for each method to be called by the service consumer, a service provider that satisfies the service level from the multiple service providers except the one service provider.

A seventh aspect of the present invention provides a computing system including: a service consumer using a service provider to provide a service to end users; and a service directory for providing an evaluation table representing, in a common format, resource information on multiple service providers as information indicative of each service provided by each service provider and/or the quality or state of the service provider, which is the basis of selection of a service provider made by the service consumer, wherein the service consumer includes: a table acquiring section for acquiring the evaluation table from the service directory; an extraction section for referring to the evaluation table acquired by the table acquiring section to perform processing for extracting, for each method to be called by an own terminal thereof, a service provider that satisfies a service level requested by the own terminal for the method from the multiple service providers; and a conversion section for converting the method into an instruction to the service provider extracted for the method when the own terminal calls the method, and sending the instruction to the service provider.

An eighth aspect of the present invention is based on the computing system of the seventh aspect, wherein the service directory includes: a resource information acquiring section for acquiring the resource information respectively from multiple service providers at predetermined intervals; a creation section for creating or updating the evaluation table based on the latest resource information acquired by the resource information acquiring section; and a notification section for notifying the service consumer of the evaluation table created or updated by the creation section.

A ninth aspect of the present invention is based on the computing system of the eighth aspect, wherein the extraction section performs the extraction processing when the table acquiring section acquires a new evaluation table.

A tenth aspect of the present invention provides a computer for using a service provider to provide a service to end users, the computer including: a table acquiring section for acquiring an evaluation table representing, in a common format, resource information on multiple service providers as information indicative of each service provided by each service provider and/or the quality or state of the service provider, which is the basis of selection of a service provider made by an own terminal thereof; an extraction section for referring to the evaluation table acquired by the table acquiring section to perform processing for extracting, for each method to be called by the own terminal, a service provider that satisfies a service level requested by the own terminal for the method from multiple service providers; and a conversion section for converting the method into an instruction to the service provider extracted for the method when the own terminal calls the method, and sending the instruction to the service provider.

An eleventh aspect of the present invention is based on the computer of the tenth aspect, wherein the table acquiring section acquires the evaluation table created or updated based on the latest resource information acquired respectively from multiple service providers at predetermined intervals, and the extraction section performs the extraction processing when the table acquiring section acquires a new evaluation table.

A twelfth aspect of the present invention provides a computer for providing an evaluation table for multiple service providers to a service consumer using a service provider to provide a service to end users, the computer including: a resource information acquiring section for acquiring resource information respectively from multiple service providers at predetermined intervals, wherein the resource information is information indicative of each service provided by each service provider and/or the quality or state of the service provider, which is the basis of selection of a service provider made by the service consumer; a creation section for creating or updating the evaluation table representing, in a common format, the resource information on multiple service providers based on the latest resource information acquired by the resource information acquiring section; and a notification section for notifying the service consumer of the evaluation table created or updated by the creation section.

A thirteenth aspect of the present invention provides a program for causing a computer, which uses a service provider to provide a service to end users, to send methods to the service provider, the program causing the computer to function as: a table acquiring section for acquiring an evaluation table representing, in a common format, resource information on multiple service providers as information indicative of each service provided by each service provider and/or the quality or state of the service provider, which is the basis of selection of a service provider made by the computer; an extraction section for referring to the evaluation table acquired by the table acquiring section to extract, for each method to be called by the computer, a service provider that satisfies a service level requested by the computer for the method from multiple service providers; and a conversion section for converting the method into an instruction to the service provider extracted for the method when the computer calls the method, and sending the instruction to the service provider.

Advantage of the Invention

According to the present invention, a service consumer that can use multiple service providers can dynamically select a service provider that satisfies a service level requested for each method to be called at the time of execution of an application.

BRIEF DESCRIPTION OF THE DRAWINGS

FIG. 4A is a diagram showing an example of each table used by the CSC in the embodiment of the present invention;

FIG. 4B is a diagram showing an example of each table used by the CSC in the embodiment of the present invention;

FIG. 4C is a diagram showing an example of each table used by the CSC in the embodiment of the present invention;

FIG. 5A is a diagram showing examples of a table used by the CSC in the embodiment of the present invention;

FIG. 5B is a diagram showing examples of a table used by the CSC in the embodiment of the present invention;

DETAILED DESCRIPTION OF EXEMPLARY EMBODIMENTS

A preferred embodiment of the present invention will now be described with reference to the accompanying drawings.

Figure 1:
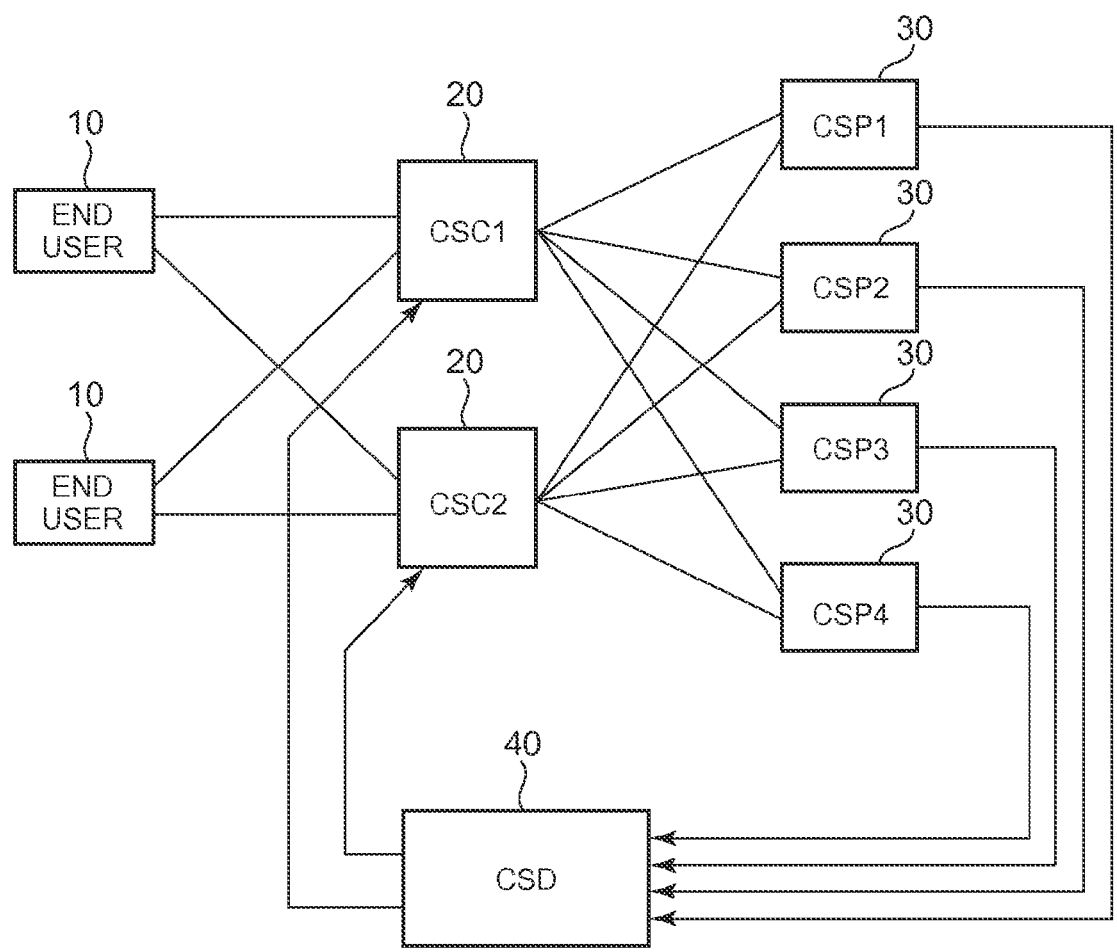
FIG. 1 is a diagram showing a configuration example of a computing system in a preferred embodiment of the present invention.

FIG. 1 is a diagram showing a configuration example of a computing system in the embodiment of the present invention. As shown, this computing system includes end users (clients) 10, cloud service consumers (hereinafter abbreviated as CSCs) 20, cloud service providers (hereinafter abbreviated as CSPs) 30, and a cloud service directory (hereinafter abbreviated as CSD) 40. Each end user 10, each CSC 20, each CSP 30, and the CSD 40 are connected through a network such as the Internet. The following will consider a case where the number of CSPs 30 is plural (many in general), though the number of CSCs 20 may be one or plural. FIG. 1 shows two CSCs 20 and four CSPs 30, but the numbers are illustrative only. In the following description, these CSCs 20 and CSPs 30 may be distinctly written as CSC1, CSC2, CSP1, CSP2, CSP3, and CSP4, respectively.

The end user 10 (client) is, for example, a terminal such as a PC. The end user 10 accesses an application of each CSC 20 to use a service provided by the CSC 20.

The CSC 20 is a server for providing its own service to the end users 10 via an application built by using the infrastructure provided by each CSP 30. Examples of the CSCs 20 include a financial institution, a municipal office, a retailer, and the like.

The CSP 30 is a server for providing software and data to each CSC 20 through a network in the form of services. Examples of the CSPs 30 include Amazon.Com Inc., Google Inc., Microsoft Corporation, and the like. In the embodiment, a form implemented by multiple CSPs 30 like the computing system in FIG. 1 is called a multi-cloud.

The CSD 40 is a server for publishing resource information on each CSP 30 collectively on a network. This resource information is information indicative of each service provided by the CSP 30 and/or the quality or state of the CSP 30, which is information used by each CSC 20 as the basis for selecting a CSP 30. For example, the resource information includes information on each service provided by each CSP 30 (the kind of service, performance, security level, and the like), information on the operational status of each CSP 30 (operating/non-operating, the presence or absence of a failure, power efficiency, and the like), and information indicative of the financial health (the continuity of the service) of each CSP 30. The CSD 40 plays a role in evaluating each CSP 30, so to speak, from the position of a third party.

In the meantime, some libraries, called meta cloud APIs, for enabling each CSC 20 to use multiple CSP 30 on a common API (Application Program Interface) have been introduced. This will enable the developer of a CSC 20 to describe, in a standardized API, an application running on any given CSP 30. However, in a meta cloud API, there is a need to give a parameter indicating which CSP 30 is targeted when a method is used for a CSP 30.

Under present circumstances, the following steps are considered in order for a CSC 20 to always use the optimum CSP 30 even after an application of the CSC 20 corresponding to the multi-cloud is developed and brought into operation:

First, the developer develops an application in consideration of which CSP 30 is best for each method while referring to resource information on each CSP 30 provided by the CSD 40 to give a parameter for specifying a CSP 30 in order to use a meta cloud API. Then, when referring to the information provided by the CSD 40 after the application is in operation and finding a more suitable CSP 30, the developer rewrites the application to change the parameter for specifying a CSP 30 to be passed to the meta cloud API and replaces it with the rewritten application to use the CSP 30 in a new combination.

Thus, under present circumstances, since correspondences between methods and CSPs 30 are determined at the time of developing the application, there are problems in dynamically selecting a CSP 30 as follows: First, after the application is in operation, a person in charge of a CSC 20 must periodically check on the CSD 40 to make a point-by-point comparison with the CSP 30 currently used in order to determine whether the combination between the method and the CSP 30 is optimum at present. Further, when there is a need to change the CSP 30 to be used, code is rewritten each time. In this case, the application in operation is stopped to replace the application with another, involving a number of man-hours and risk.

Therefore, it is desired that the CSC 20 should select and use the optimum CSP 30 as needed, rather than that the person in charge determines the optimum CSP 30. Conventional dynamic optimization techniques generally used for this purpose include workload balancing and the like. This technique has a task dispatcher (or equivalent) check on the performance or the like of each resource arbitrarily to conduct dynamic allocation of a task and the like. However, applying such a technique to the selection of a CSP 30 causes the following problems:

First, in order to check on the performance of a CSP 30 by means of the dispatcher, there is a need to subscribe to the CSP 30 and get an evaluation account. Thus, to check dynamically on the performance or the like, the user account has to be acquired from all CSPs 30, which could be targets, including CSPs 30 not currently being used, requiring extra acquisition and management costs. Further, the evaluation of a CSP 30 can be affected by the financial health of the CSP 30 or the like, but the conventional means such as the dispatcher cannot acquire such a parameter.

Therefore, in the embodiment, the evaluations of multiple CSPs 30 not only about information on the qualities of services provided but also about information including the financial health and the like that could affect the qualities of the services are provided in a common format by the CSD 40 on a network. Then, each CSC 20 dynamically determines an appropriate CSP 30 in the level of an API used by the CSC 20 to provide a framework capable of using the CSP 30. In other words, in the embodiment, an application of the CSC 20 in a multi-cloud environment selects, in real time, an appropriate CSP 30 for each method at present without being aware of each CSP 30 to provide a library capable of issuing a request to the CSP 30.

Figure 2:
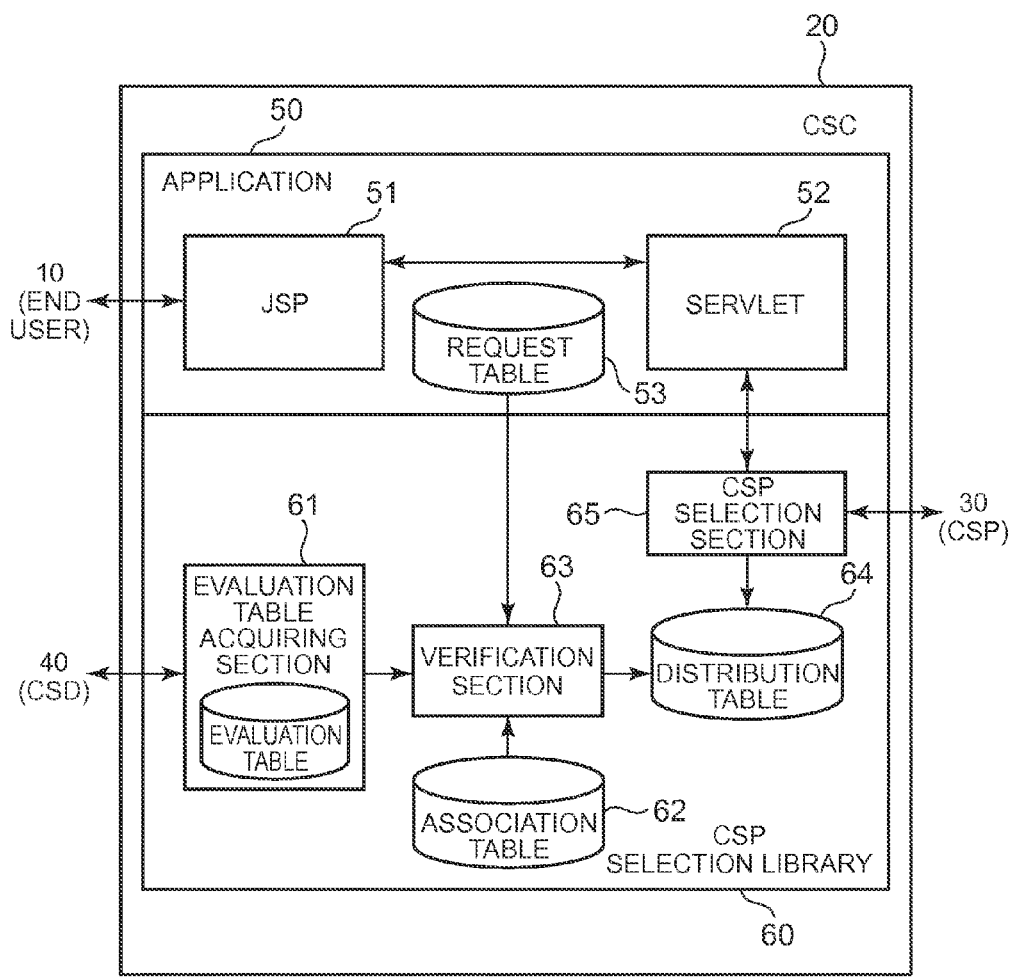
FIG. 2 is a block diagram showing an example of the functional configuration of a cloud service consumer (CSC) in the embodiment of the present invention.

FIG. 2 is a block diagram showing an example of the functional configuration of a CSC 20 in the embodiment of the present invention. As shown, the CSC 20 includes an application 50 and a CSP selection library 60. The CSP selection library 60 is a meta cloud API library for dynamically determining and allocating an appropriate CSP 30 in response to a request from an end user 10.

The application 50 is executed to cause the CSC 20 to provide its service to the end user 10. The application 50 is, for example, made of JSP (JavaServer Pages) 51 and a servlet 52, including a request table 53.

The request table 53 is a table in which service levels requested by the CSC 20 are listed in a format such as XML for the CSP selection library 60. Each CSC 20 predefines, for each item of the resource information, how much performance or security level is required for its own application 50, and holds the information as the request table 53. The request table 53 is loaded at the time of startup of the application 50 or the like by a method for loading the request table of the CSP selection library 60.

The CSP selection library 60 dynamically acquires and analyzes the information on the service levels requested by the CSC 20 and the resource information provided by the CSD 40, creates, inside the library, information on an appropriate CSP 30 for each method (request), and executes the method for the appropriate CSP 30. The CSP selection library 60 includes an evaluation table acquiring section 61, an association table 62, a verification section 63, a distribution table 64, and a CSP selection section 65.

The evaluation table acquiring section 61 acquires, from the CSD 40 through the network, an evaluation table 42 (see FIG. 3 to be described later) as a table in which an evaluation on the item of service level of each CSP 30 is expressed in a format such as XML for the CSP selection library 60. In the embodiment, the evaluation table acquiring section 61 is provided as an example of a table acquiring section for acquiring an evaluation table.

The association table 62 is a table in which the items of service levels associated with respective methods called at the time of execution of the application 50 are listed in a format such as XML. In other words, the association table 62 is to predefine, for each method, an item of a service level, which is requested by the CSC 20 upon calling a certain method and is to be secured, among the items of the resource information listed in the request table 53.

The verification section 63 checks the request table 53, the association table 62, and the evaluation table 42 acquired by the evaluation table acquiring section 61 against one another to create a distribution table 64 to be described later. In this regard, the verification section 63 checks the tables against one another for all items of the resource information defined in the association table 62 to be associated with a certain method to extract, for each method, a CSP 30 that satisfies the service level requested in the request table 53. In the embodiment, the verification section 63 is provided as an example of an extraction section for extracting a service provider.

The distribution table 64 is a table in which an appropriate CSP 30 for each method is listed in a format such as XML. Here, the term "appropriate" means a state in which all items of the resource information defined in the association table 62 to be associated with a certain method satisfy the service levels requested in the request table 53. The distribution table 64 is internally created by the CSP selection library 60 when the CSC 20 calls a method of creating a distribution table of the CSP selection library 60 at specific timing, such as at the time of startup of the application 50.

The CSP selection section 65 refers to the distribution table 64 when a certain method is called by the execution of the application 50 to select an appropriate CSP 30 for the method. Then, the CSP selection section 65 uses the API of the CSP selection library 60 to convert the method to an instruction to the appropriate CSP 30 and send it to the CSP 30. In the embodiment, the CSP selection section 65 is provided as an example of a conversion section for converting the method to an instruction to the service provider extracted and sending the instruction.

Figure 3:
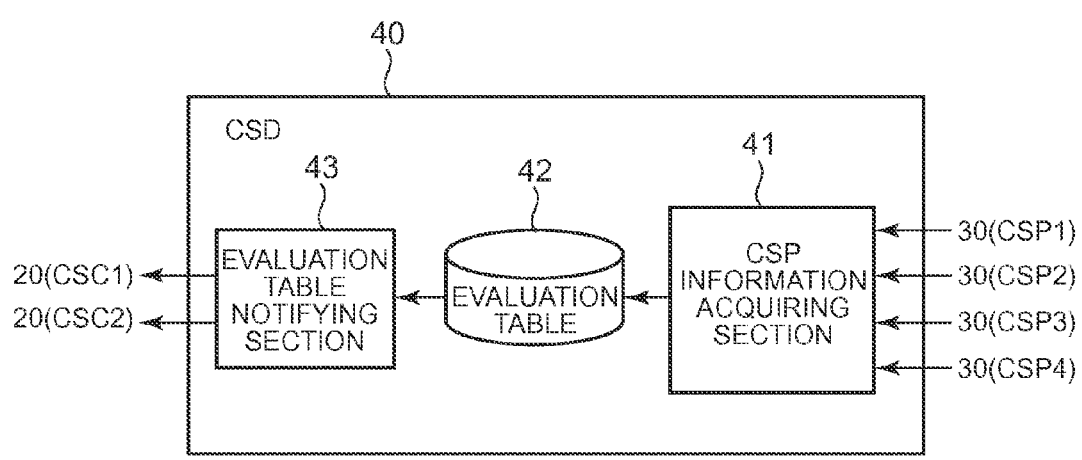
FIG. 3 is a block diagram showing an example of the functional configuration of a cloud service directory (CSD) in the embodiment of the present invention.

FIG. 3 is a block diagram showing an example of the functional configuration of the CSD 40 in the embodiment of the present invention. As shown, the CSD 40 includes a CSP information acquiring section 41, an evaluation table 42, and an evaluation table notifying section 43.

The CSP information acquiring section 41 acquires resource information as mentioned above from each of the CSPs 30 (in the example of FIG. 1, CSP1 to CSP4) through the network. For this acquisition, each CSP 30 may send the resource information to the CSD 40 at predetermined intervals, or each time the resource information on any of the CSPs 30 is changed, the CSP 30 may send the resource information to the CSD 40. In the embodiment, the CSP information acquiring section 41 is provided as an example of a resource information acquiring section for acquiring the resource information and a creation section for creating or updating the evaluation table.

The evaluation table 42 is a table in which an evaluation on each item of resource information on each CSP 30 is represented in a format such as XML for the CSP selection library 60. The CSP information acquiring section 41 acquires the updated content of the resource information so that the latest evaluations of each CSP 30 will be listed in the evaluation table 42.

The evaluation table notifying section 43 notifies each CSC 20 of the evaluation table 42 through the network. For example, the evaluation table notifying section 43 may send the evaluation table 42 passively based on a request from the evaluation table acquiring section 61 in each CSC 20 (Pull type). Alternatively, the evaluation table notifying section 43 may send the evaluation table 42 from the CSD 40 to each CSC 20 actively at predetermined intervals or each time the evaluation table 42 is updated (Push type). In the embodiment, the evaluation table notifying section 43 is provided as an example of a notification section for notifying a service consumer of the evaluation table.

Next, specific examples of the request table 53, the association table 62, the evaluation table 42, and the distribution table 64 will be described. FIG. 4 and FIG. 5 are diagrams showing an example of each table used by the CSC 20 in the embodiment of the present invention. FIG. 4 shows an example of the request table 53, the association table 62, and the evaluation table 42, and FIG. 5 shows examples of the distribution table 64. Although the request table 53, the association table 62, the evaluation table 42, and the distribution table 64 are actually written in a format such as XML, these contents are interpreted by using tables for convenience sake.

FIG. 4A shows an example of the request table 53. For example, it is assumed that the CSC1 in FIG. 1 attaches weight to items of "network performance," "virtual system performance," "utilization rate," "security," and "CSP's financial health" of a service used by itself. Therefore, the CSC1 defines the service levels requested for these items, for example, on a scale of ten numeric values as shown in FIG. 4A. The CSC2 in FIG. 1 also defines the service levels requested for the items to which weight is attached by itself in the same manner as in FIG. 4A.

In FIG. 4, it is assumed that the level of "1" is highest and the levels are going down as the figures become large. Note that the scale of ten numeric values is just an example. For example, the levels can be defined more specifically, such as that, in the case of "utilization rate," level "1" is some percent or more and level "2" is from less than that up to any other percent, or that in the case of "security," the level is "1" if it corresponds to a certain function and the level is "2" if it does not correspond to some functions.

FIG. 4B shows an example of the association table 62. For example, for "Method1," "network performance" and "CSP's financial health" are defined as associated items as shown in FIG. 4B. It is generally considered that associated items are different from method to method. However, in this example, it is assumed that "CSP's financial health" is associated with all methods. Assuming that FIG. 4B shows the association table 62 of the CSC1, the CSC1 requests that the levels defined in the request table 53 of FIG. 4A are ensured for the items of "network performance" and "CSP's financial health" when "Method1" is called. Note that the CSC2 also has a similar association table 62 as that in FIG. 4B.

Information indicative of a level of importance to each item may also be included in the association table 62 together with the associated items. Then, when the verification section 63 refers to the association table 62 to create the distribution table 64, the item may be weighted by the level of importance, such as to preferentially select a CSP 30 having a high rating of an associated item to which this level of importance is high.

The CSP selection library 60 predefines the associated items of resource information in the association table 62 as shown in FIG. 4B for all methods to be called at the time of execution of the application 50. However, depending on the method, a default CSP 30 can be used without selecting an appropriate CSP 30. In this case, there is no need to list the method in the association table 62.

FIG. 4C shows an example of the evaluation table 42. Here, each item of "network performance," "virtual system performance," "utilization rate," "security," and "CSP's financial health" shown in FIG. 4A is evaluated for each of CSP1 to CSP4. As shown in FIG. 4C, evaluations of various pieces of resource information on each CSP 30 are put together in the evaluation table 42 according to the same level definitions as those in the request table 53.

In the embodiment, as shown in FIG. 4A to FIG. 4C, the formats of the request table 53, the association table 62, and the evaluation table 42 contained in each CSC 20 and the CSD 40, and the definition of the service level for each item of the resource information are set as open industry standard specifications and predefined commonly throughout the entire computing system.

FIG. 5A and FIG. 5B show examples of the distribution table 64. For example, FIG. 5A indicates that the appropriate CSP 30 for "Method1" is CSP2 among CSP1 to CSP4. The method of creating the distribution table 64 from the request table 53, the association table 62, and the evaluation table 42 will be specifically described below.

Figure 6:
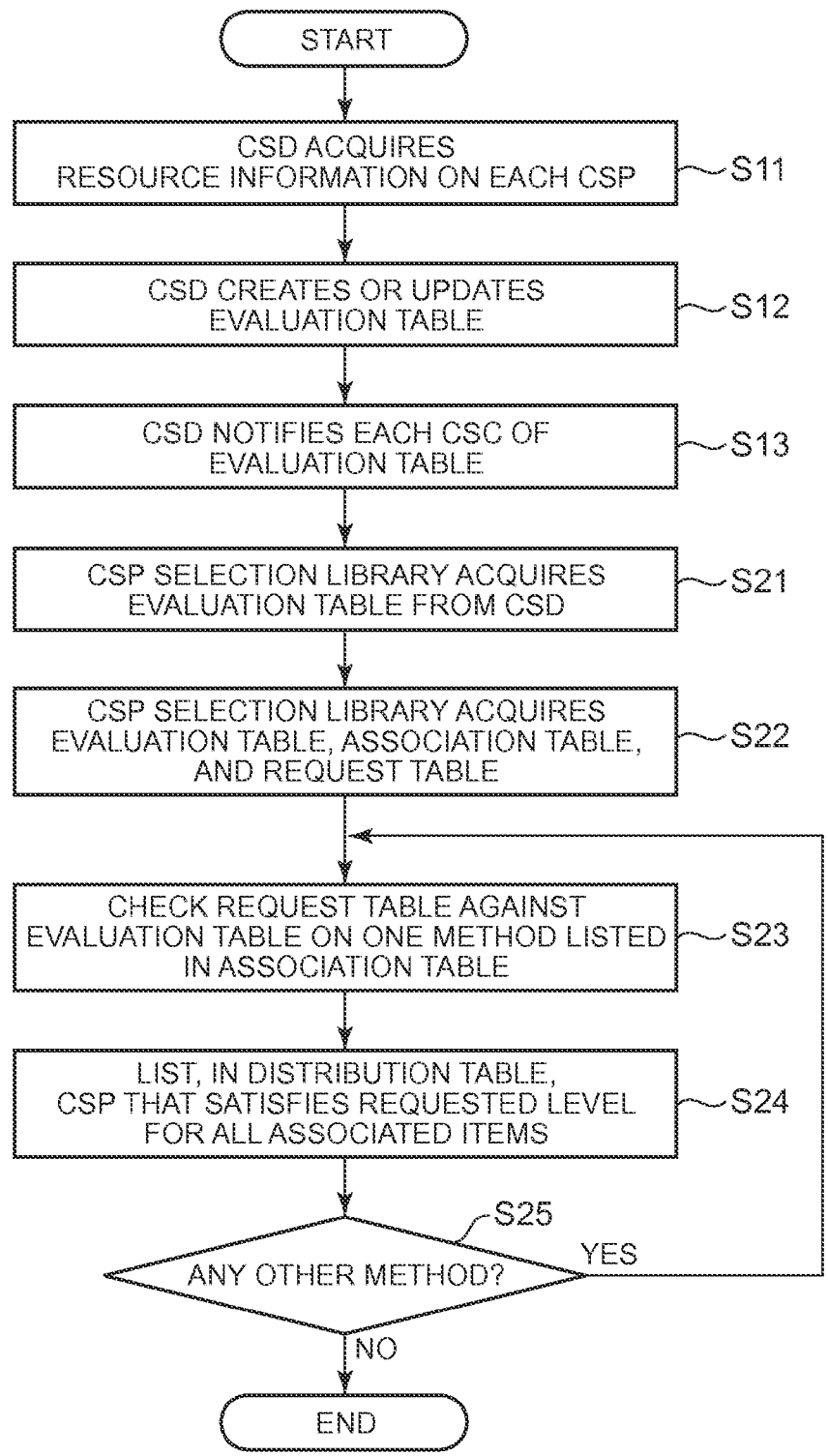
FIG. 6 is a flowchart showing an example of operation for creating a table used by the CSC when selecting a cloud service provider (CSP) in the embodiment of the present invention.

The following will describe the operation of each CSC 20 and the CSD 40 in the embodiment. FIG. 6 is a flowchart showing an example of operation for creating the distribution table 64 (method of creating the distribution table) used by the CSC 20 when selecting a CSP 30 in the embodiment of the present invention.

First, the CSP information acquiring section 41 of the CSD 40 acquires resource information from each of the CSPs 30 (CSP1 to CSP4) through the network (step 11). As mentioned above, the CSP information acquiring section 41 acquires the resource information at predetermined intervals or each time resource information on any CSP 30 is changed. Next, the CSD 40 creates or updates the evaluation table 42 from the resource information acquired by the CSP information acquiring section 41 (step 12). Then, the evaluation table notifying section 43 notifies each CSC 20 of the evaluation table 42 through the network, for example, at predetermined intervals or each time the evaluation table 42 is updated (step 13).

On the other hand, in each CSC 20, the evaluation table acquiring section 61 of the CSP selection library 60 acquires the evaluation table 42 from the CSD 40 (step 21). Next, the verification section 63 acquires this evaluation table 42, the association table 62 held in advance by the CSP selection library 60, and the request table 53 contained in the application 50 (step 22). Then, the verification section 63 checks the request table 53 against the evaluation table 42 on one method listed in the association table 62 (step 23). As the CSP 30 to be used for the method, the verification section 63 lists, in the distribution table 64, a CSP 30 that satisfies the service levels requested in the request table 53 for all items of the resource information defined in the association table 62 to be associated with the method (step 24). When there is any other method, the procedure returns to step 23, while when listing in the distribution table 64 for all methods is completed, the operation is terminated (step 25).

Processing in step 23 and step 24 performed by the verification section 63 will be described in detail by using the example shown in FIG. 4A to FIG. 4C. First, for "Method1," since items defined as associated items in the association table 62 are "network performance" and "CSP's financial health," a CSP 30 satisfying such a requested level that the "network performance" is "1" and the "CSP's financial health" is "5" or more defined in the request table 53 as the highest is found from the evaluation table 42. Since only CSP2 satisfies this requested level among CSP1 to CSP4, the CPS to be used for "Method1" is listed as "CSP2."

For "Method2," since the associated items are "security" and "CSP's financial health" according to the association table 62, a CSP 30 satisfying such a requested level that the "security" is "3" or more and the "CSP's financial health" is "5" or more defined in the request table 53 is found from the evaluation table 42. Although there are two CSPs, CSP1 and CSP3, that satisfy this requested level, it is assumed in this example that CSP3 is selected, listing "CSP3" as the CSP to be used for "Method2." This is because a higher level is requested for "security" than "CSP's financial health" and a comparison between evaluations of CSP1 and CSP3 about "security" shows that "2" for CSP3 is higher than "3" for CSP1. Thus, when there are two or more CSPs 30 that satisfy the conditions, attention may be given to an item higher in requested service level among the associated items for the method to preferentially select one higher in evaluation on the item.

For "Method3," since the associated items are "virtual system performance," "utilization rate," and "CSP's financial health" according to the association table 62, a CSP 30 satisfying such a requested level that the "virtual system performance" is "3" or more, the "utilization rate" is "2" or more, and the "CSP's financial health" is "5" or more defined in the request table 53 is found from the evaluation table 42. Since only CSP1 satisfies this requested level, the CPS to be used for "Method3" is listed as "CSP1."

The distribution table 64 thus created is shown in FIG. 5A. If there is no CSP 30 that satisfies the requested level for all the associated items, a default CSP 30, for example, may be set as the CSP to be used for the method. Alternatively, a CSP 30 having the largest number of associated items that satisfies the requested level may be set as the CSP used.

Figure 7:
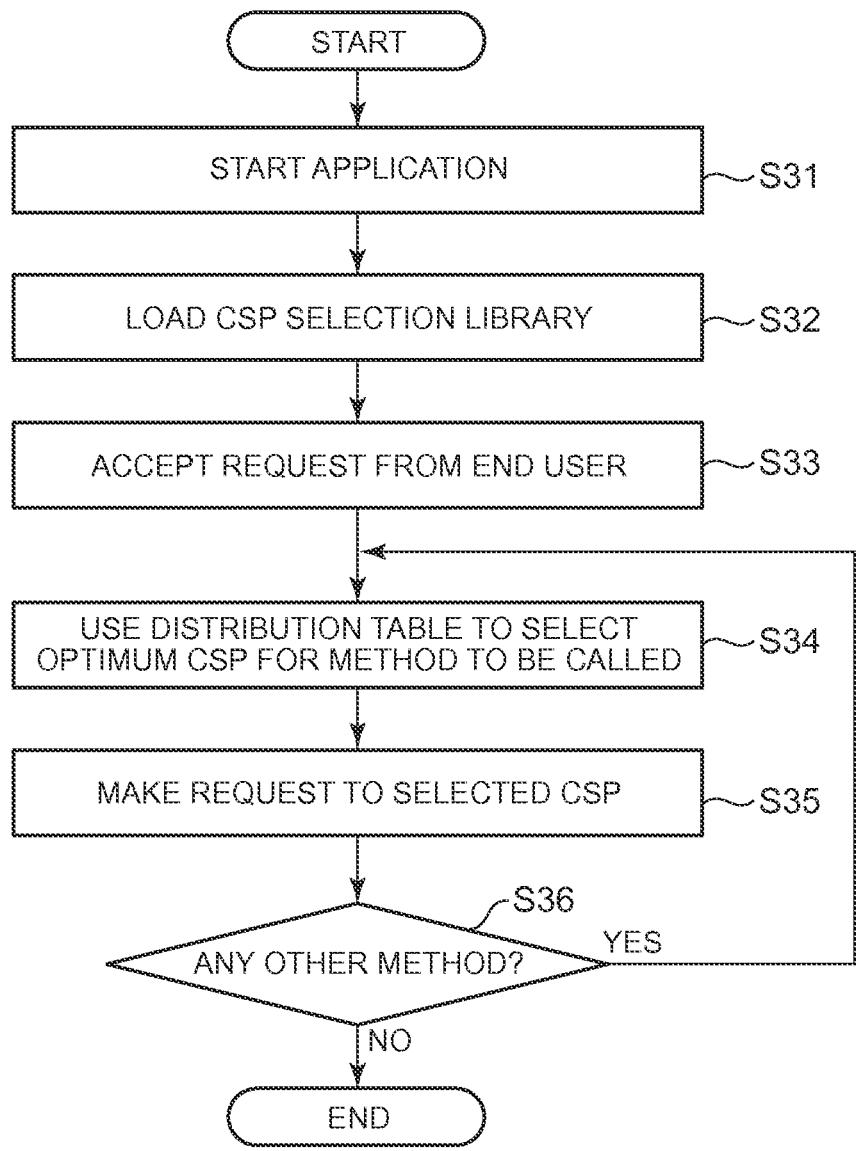
FIG. 7 is a flowchart showing an example of operation when the CSC sends a method to the CSP in the embodiment of the present invention.

Next, operation when each CSC 20 uses the distribution table 64 to send a method to an appropriate CSP 30 will be described. FIG. 7 is a flowchart showing an example of operation when the CSC 20 sends a method to the CSP 30 in the embodiment of the present invention.

First, the CSC 20 starts the application 50 (step 31). Upon startup, the application 50 loads the CSP selection library 60 (step 32). In the application 50, for example, a library of the CSP selection library 60 is loaded upon startup of the servlet 52. Then, the CSP selection library 60 may conduct the method of creating the distribution table in FIG. 6 at appropriate timing, such as upon this startup, at each predetermined interval, or when the evaluation table acquiring section 61 has acquired the evaluation table 42 from the CSD 40, to create the distribution table 64.

Here, the application 50 of the CSC 20 accepts a request (transaction) from an end user 10 (step 33). In general, the request is divided into multiple methods to be called one by one. However, in the embodiment, the application 50 itself does not need to specify which CSP 30 is used to call each method. Instead, the CSP selection library 60 uses the distribution table 64 to select an appropriate CSP 30 for executing the method (step 34). Then, the CSP selection section 65 of the CSP selection library 60 converts the method to an instruction to the selected CSP 30 to make a request to the CSP 30 (step 35). In other words, the application 50 uses the API of the CSP selection library 60 to send the method to the selected CSP 30. When there is any other method to be executed, the procedure returns to step 34, while when there is no method to be executed, the operation is terminated (step 36).

In the embodiment, as a technique for the CSC 20 to receive an update of the evaluation table 42 from the CSD 40, a Push notification from the CSD 40 can be particularly used. A configuration using such a Push notification will be described below.

In the embodiment, for example, when any CSP 30 is broken down due to a disaster or any other failure, the CSP information acquiring section 41 of the CSD 40 acquires, at the timing when the resource information on the CSP 30 has been changed (breakdown has occurred), information on the change. Then, the CSD 40 updates the evaluation table 42, and the evaluation table notifying section 43 sends a Push notification of the updated evaluation table 42 to all the CSCs 20. This enables each CSC 20 to receive the latest evaluation table 42 timely when the evaluation table 42 has been updated. Further, in response to acquiring the latest evaluation table 42 push-notified, if the CSP selection library 60 of each CSC 20 conducts the method of creating the distribution table in FIG. 6, each CSC 20 can have the distribution table 64 in which an appropriate CSP 30 for each method at present is listed. This enables each CSC 20 to dynamically select an appropriate CSP 30 at present when calling each method.

For example, in the example shown in FIG. 4A to FIG. 4C, it is considered a case where CSP3 is broken down. As mentioned above, there are CSP1 and CSP3 as candidates for the appropriate CSP 30 with respect to "Method2." However, in this case, since the CSP selection library 60 of each CSC 20 acquires the evaluation table 42 including information indicating that CSP3 has been broken down to conduct the method of creating the distribution table in FIG. 6, CSP1 is selected as the CSP 30 to be used for "Method2." As a result, the distribution table 64 created in this case is shown in FIG. 5B. Thus, since each CSC 20 acquires the latest evaluation table 42 from the CSD 40 through a Push notification, a CSP 30 can be selected to minimize the influences on the end user 10 and each CSC 20 even if a disaster or the like has occurred.

As described above, in the embodiment, the CSD 40 provides the evaluation of the resource information on each CSP 30 in the form of the evaluation table 42, and each CSC 20 defines service levels requested by itself and items of resource information associated with each method in the forms of the request table 53 and the association table 62, respectively. Then, the formats of these tables and the definition of the service level for each item of the resource information are standardized throughout the entire computing system. This enables each CSC 20 to use the distribution table 64 to select and use an appropriate CSP 30 for each method.

Further, in the embodiment, each time the resource information on each CSP 30 is changed, the CSD 40 updates the evaluation table 42 and sends a Push notification to each CSC 20. In response to acquiring the latest evaluation table 42, each CSC 20 updates the distribution table 64. This enables each CSC 20 to select and use an appropriate CSP 30 for each method at present.

Figure 8:
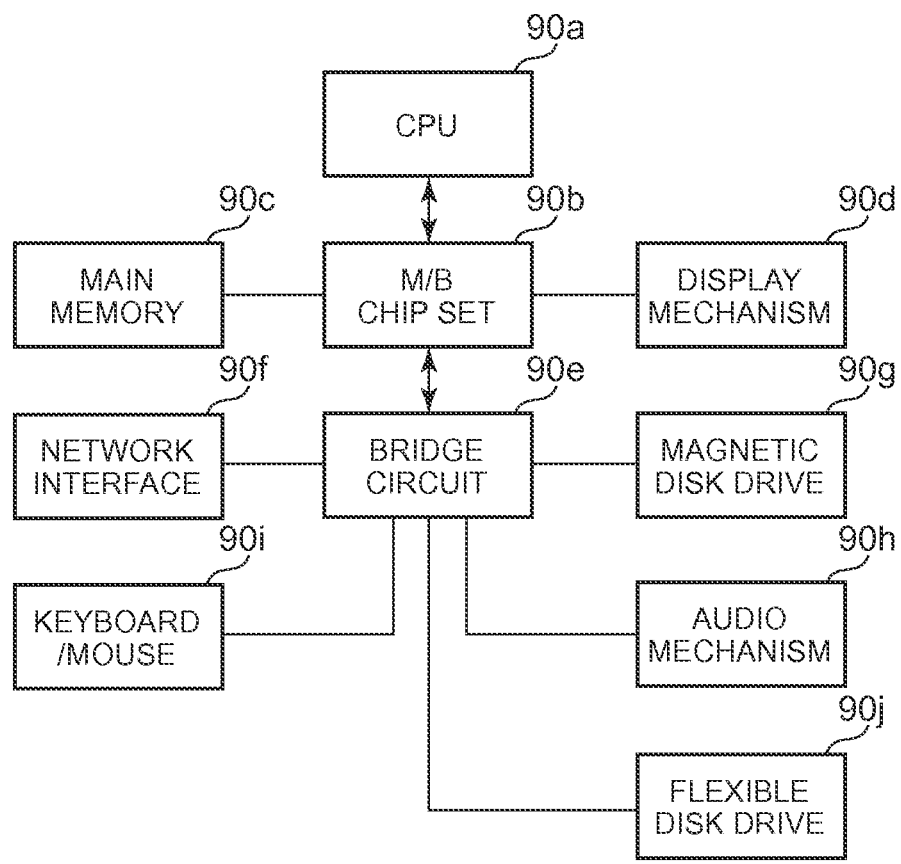
FIG. 8 is a diagram showing an example of the hardware configuration of a computer to which the embodiment of the present invention is applicable.

Finally, a hardware configuration of a computer to which it is suited to apply the embodiment will be described. FIG. 8 is a diagram showing an example of the hardware configuration of a computer for implementing a CSC 20 or the CSD 40. As shown, the computer includes a CPU (Central Processing Unit) 90a serving as computing means, a main memory 90c connected to the CPU 90a through an M/B (motherboard) chip set 90b, and a display mechanism 90d connected also to the CPU 90a through the M/B chipset 90b. Further, a network interface 90f, a magnetic disk drive (hard disk drive: HDD) 90g, an audio mechanism 90h, a keyboard/mouse 90i, and a flexible disk drive 90j are connected to the M/B chip set 90b through a bridge circuit 90e.

In FIG. 8, each component is connected through a bus. For example, the CPU 90a and the M/B chip set 90b, and the M/B chip set 90b and the main memory 90c are connected through a CPU bus. Although the M/B chip set 90b and the display mechanism 90d may be connected through an AGP (Accelerated Graphics Port), if the display mechanism 90d includes a PCI Express-capable video card, the M/B chip set 90b and this video card will be connected through a PCI Express (PCIe) bus. Further, for connection with the bridge circuit 90e, PCI Express, for example, can be used for the network interface 90f. For the magnetic disk drive 90g, for example, serial ATA (AT Attachment), parallel transfer ATA, or PCI (Peripheral Components Interconnect) can be used. Further, a USB (Universal Serial Bus) can be used for the keyboard/mouse 90i and the flexible disk drive 90j.

Here, all the functions of the service consumer and the service directory of the present invention may be implemented in either hardware or software, or in both hardware and software. Further, the present invention can be implemented as a computer, a data processing system, or a computer program. This computer program can be stored on a computer-readable medium and provided. Here, the medium may be an electronic, magnetic, optical, electromagnetic, infrared, or semiconductor system (apparatus or device), or a propagation medium. Specific examples of computer-readable media will include a semiconductor or solid-state storage device, a magnetic tape, a removable computer diskette, a random access memory (RAM), a read-only memory (ROM), a rigid magnetic disk, and an optical disk. Examples of optical disks so far include a compact disk read-only memory (CD-ROM), a compact disk read/write (CD-R/W), and a DVD.

While the present invention is described with reference to the embodiment, the technical scope of the present invention is not limited to the aforementioned embodiment. Those skilled in the art will appreciate that various modifications and alternative embodiments are possible without departing from the scope and spirit of the present invention.

DESCRIPTION OF REFERENCE NUMERALS

10 . . . End User, 20 . . . Cloud Service Consumer (CSC), 30 . . . Cloud Service Provider (CSP), 40 . . . Cloud Service Directory (CSD), 41 . . . CSP Information Acquiring Section, 42 . . . Evaluation Table, 43 . . . Evaluation Table Notifying Section, 50 . . . Application, 51 . . . JSP, 52 . . . Servlet, 53 . . . Request Table, 60 . . . CSP Selection Library, 61 . . .

Evaluation Table Acquiring Section, 62 . . . Association Table, 63 . . . Verification Section, 64 . . . Distribution Table, 65 . . . CSP Selection Section.

What is claimed is:

1. A method of sending processing methods to a service provider from a service consumer using the service provider to provide a service to end users, the method comprising:

acquiring an evaluation table from a service directory representing, in a common format, resource information on a plurality of service providers as information indicative of each service provided by each service provider and a quality or state of the service provider, which is the basis of selection of a service provider made by the service consumer, wherein the service provider provides cloud infrastructure to the service consumer in order to use the processing method to provide the service to the end users and wherein the resource information comprises information indicative of a financial health of each of the plurality of service providers and information on the operational status of each service provider including an indication of power efficiency of the service provider;

referring to the acquired evaluation table to extract, for each processing method to be called by the service consumer, a service provider that satisfies a service level requested by the service consumer for the processing method from the plurality of service providers; and converting the processing method into an instruction to the service provider extracted for the processing method when the service consumer calls the processing method using an Application Programming Interface (API) of the extracted service provider, and sending the instruction to the service provider.

2. The method of claim 1, further comprising updating the evaluation table each time the resource information on any of the plurality of service providers is changed, wherein acquiring an evaluation table representing, in a common format, resource information includes acquiring the updated evaluation table.

3. The method of claim 2, wherein when a failure occurs in one of the plurality of service providers, the evaluation table in which resource information indicating that the one service provider is unavailable is reflected to extract, for each processing method to be called by the service consumer, a service provider that satisfies the service level from the plurality of service providers except the one service provider.

4. The method of claim 1, wherein the acquired evaluation table is referred to extract, for each processing method to be called by the service consumer, a service provider that satisfies a service level from the plurality of service provider, where the service level is requested by the service consumer for an associated item as an item of the resource information predefined to be associated with the processing method.

5. The method of claim 4 wherein the acquired evaluation table is referred to extract, for each processing method to be called by the service consumer, a service provider that satisfies a service level from the plurality of service provider, where the service level is requested by the service consumer for the associated item of the processing method including an item of information indicative of a state of the service provider in which a quality of a service provided by the service provider could be affected.

6. A method of sending processing methods to a service provider from a service consumer using the service provider to provide a service to end users, the method comprising:

acquiring resource information respectively from a plurality of service providers at predetermined intervals, where the resource information is information indicative of each service provided by each service provider and a quality or state of the service provider, which is the basis of selection of a service provider made by the service consumer, wherein the service provider provides cloud infrastructure to the service consumer in order to use the processing method to provide the service to the end users and wherein the resource information comprises information indicative of a financial health of each of the plurality of service providers and information on the operational status of each service provider including an indication of power efficiency of the service provider;

creating or updating an evaluation table representing, in a common format, the resource information on the plurality of service providers based on the acquired latest resource information;

acquiring the updated evaluation table each time the evaluation table is updated;

referring to the evaluation table in response to acquiring the updated evaluation table to extract, for each processing method to be called by the service consumer, a service provider that satisfies a service level from the plurality of service providers, where the service level is requested by the service consumer for an associated item of the processing method as an item of the resource information predefined to be associated with the processing method and including an item of information indicative of a state of the service provider in which a quality of a service provided by the service provider could be affected; and converting the processing method into an instruction to the service provider extracted for the processing method when the service consumer calls the processing method using an API of the extracted service provider, and sending the instruction to the service provider, wherein when a failure occurs in one of the plurality of service providers, the evaluation table in which resource information indicating that the one service provider is unavailable is reflected is referred to extract, for each processing method to be called by the service consumer, a service provider that satisfies the service level from the plurality of service providers except the one service provider.

7. A computing system comprising:

a service consumer using a service provider to provide a service to end users; and a service directory stored in a memory for providing an evaluation table representing, in a common format, resource information on a plurality of service providers as information indicative of each service provided by each service provider and a quality or state of the service provider, which is the basis of selection of a service provider made by the service consumer, wherein the service provider provides cloud infrastructure to the service consumer in order to use processing methods to provide the service to the end users and wherein the resource information comprises information indicative of a financial health of each of the plurality of service providers and information on the operational status of each service provider including an indication of power efficiency of the service provider, wherein the service consumer comprises:

a table acquiring section for acquiring the evaluation table from the service directory;

an extraction section for referring to the evaluation table acquired by the table acquiring section to perform processing for extracting, for each processing method to be called by a terminal thereof, a service provider that satisfies a service level requested by the terminal for the processing method from the plurality of service providers; and a conversion section for converting the processing method into an instruction to the service provider extracted for the processing method when the terminal calls the processing method using an API of the extracted service provider, and sending the instruction to the service provider.

8. The computing system of claim 7, wherein the service directory comprises:

a resource information acquiring section for acquiring the resource information respectively from the plurality of service providers at predetermined intervals;

a creation section for creating or updating the evaluation table based on the latest resource information acquired by the resource information acquiring section; and a notification section for notifying the service consumer of the evaluation table created or updated by the creation section.

9. The computing system of claim 8, wherein the extraction section performs the extraction processing when the table acquiring section acquires a new evaluation table.

10. A computer for using a service provider to provide a service to end users, the computer comprising a non-transitory computer memory, the computer further comprising:

a table acquiring section for acquiring an evaluation table representing, in a common format, resource information on a plurality of service providers as information indicative of each service provided by each service provider and a quality or state of the service provider, which is the basis of selection of a service provider made by a terminal thereof, wherein the service provider provides cloud infrastructure to the service consumer in order to use processing methods to provide the service to the end users and wherein the resource information comprises information indicative of a financial health of each of the plurality of service providers and information on the operational status of each service provider including an indication of power efficiency of the service provider;

an extraction section for referring to the evaluation table acquired by the table acquiring section to perform processing for extracting, for each processing method to be called by the terminal, a service provider that satisfies a service level requested by the terminal for the processing method from the plurality of service providers; and a conversion section for converting the processing method into an instruction to the service provider extracted for the processing method when the terminal calls the processing method using an API of the extracted service provider, and sending the instruction to the service provider.

11. The computer of claim 10, wherein the table acquiring section acquires the evaluation table created or updated based on the latest resource information acquired respectively from the plurality of service providers at predetermined intervals, and wherein the extraction section performs the extraction processing when the table acquiring section acquires a new evaluation table.

12. A computer for providing an evaluation table for a plurality of service providers to a service consumer using a service provider to provide a service to end users, the computer comprising a non-transitory computer memory, the computer further comprising:

a resource information acquiring section for acquiring resource information respectively from the plurality of service providers at predetermined intervals, wherein the resource information is information indicative of each service provided by each service provider and a quality or state of the service provider, which is the basis of selection of a service provider made by the service consumer, wherein the service provider provides cloud infrastructure to the service consumer in order to use processing methods to provide the service to the end users and wherein the resource information comprises information indicative of a financial health of each of the plurality of service providers and information on the operational status of each service provider including an indication of power efficiency of the service provider;

a creation section for creating or updating the evaluation table representing, in a common format, the resource information on the plurality of service providers based on the latest resource information acquired by the resource information acquiring section; and a notification section for notifying the service consumer of the evaluation table created or updated by the creation section.

13. A program for causing a computer, which uses a service provider to provide a service to end users, to send processing methods to the service provider, the program stored in non-transitory computer memory, the program causing the computer to function as:

a table acquiring section for acquiring an evaluation table representing, in a common format, resource information on a plurality of service providers as information indicative of each service provided by each service provider and a quality or state of the service provider, which is the basis of selection of a service provider made by the computer, wherein the service provider provides cloud infrastructure to the service consumer in order to use the processing method to provide the service to the end users and wherein the resource information comprises information indicative of a financial health of each of the plurality of service providers and information on the operational status of each service provider including an indication of power efficiency of the service provider;

an extraction section for referring to the evaluation table acquired by the table acquiring section to extract, for each processing method to be called by the computer, a service provider that satisfies a service level requested by the computer for the processing method from the plurality of service providers; and a conversion section for converting the processing method into an instruction to the service provider extracted for the processing method when the computer calls the processing method using an API of the extracted service provider, and sending the instruction to the service provider.

* * * * *